Patented June 19, 1934

1,963,142

UNITED STATES PATENT OFFICE 1,963,142

COATING COMPOSITION

William Henry Moss and George Wilbur Seymour, Cumberland, Md., assignors to Celanese Corporation of America, a corporation of Delaware No Drawing. Application November 7, 1929,
Serial No. 405,539

22 Claims. (Cl. 134—79)

This invention relates to the preparation of compositions of matter such as coating compositions and plastic compositions containing organic derivatives of cellulose, a synthetic resin and a solvent therefor, and relates more particularly to the use of certain medium or high boiling solvents in the preparation of such compositions of matter.

An object of our invention is to form coating or plastic compositions containing organic derivatives of cellulose by dissolving the same in a solvent mixture containing a medium boiling solvent of the higher ketone type. Other objects of our invention will appear from the following detailed description.

The preparation of lacquers containing derivatives of cellulose requires a considerable amount of skill because of the complicated nature of the requirements of such lacquers. It is necessary that the solid and solvent mixtures employed be such that the solution will dry rapidly and leave a tough, hard, clear and homogeneous film.

In the preparation of such lacquers it is necessary to employ a resin or gum in order to cause the film produced to adhere to smooth surfaces. When such resins are added to solutions of derivatives of cellulose, it is often necessary to vary the solvent mixture in such a manner so as to maintain the resin and the derivative of cellulose in solution during the whole period of drying of the lacquer film. Often even if the resin is soluble in the same solvents as are the derivatives of cellulose, yet a film from a solution containing both the derivative of cellulose and the synthetic resin does not dry out perfectly clear. In some cases the resin may be readily soluble in a hydrocarbon but not very soluble in an ester such as butyl acetate or ethyl lactate, while the derivative of cellulose is soluble in the ester but not the hydrocarbon. It will thus be seen that in order to obtain a solution containing both resin and a derivative of cellulose that will dry out to a clear film, very careful balancing of the ester and the hydrocarbon used as the solvents is necessary.

In the preparation of lacquers containing organic derivatives of cellulose such as cellulose acetate, the matter is further complicated by the fact that there are but relatively few resins that are compatible with the organic derivatives of cellulose, and even in those cases where the resin is compatible, the films produced from such lacquers are clear only when certain special combinations of solvents are employed. In the preparation of lacquers, the solvents employed are divided into three classes according to their boiling point. The low boiling solvents are those that boil between 50° and 80° C., the medium boiling solvents have their boiling point between 80° C. and 130° C., and high boiling solvents between 130 and 200° C. Since the medium or high boiling solvents are the last portions of the solvents that are left in the film on drying, it is extremely important that the said medium or high boiling solvents or mixtures thereof that are employed should be capable of keeping the resins and the organic derivatives of cellulose in complete solution during the period of drying of the film formed from such lacquer, so that a clear, homogeneous film is produced.

We have found that certain higher ketones are suitable for use in a lacquer containing an organic derivative of cellulose.

In accordance with our invention we prepare plastic or coating compositions by dissolving organic derivatives of cellulose with or without synthetic resins compatible therewith in a solvent mixture containing a medium boiling solvent which is a higher ketone having at least four carbon atoms, and containing a hydroxyl group or is derived from such compound. Any suitable low boiling solvent may be employed as well as suitable plasticizers and pigments, dyes, or effect materials, if desired. High boiling solvents may be employed but their use is not necessary.

Any suitable organic derivative of cellulose may be employed, examples of which are cellulose esters and cellulose ethers. Examples of organic esters of cellulose are cellulose acetate, cellulose formate, cellulose propionate and cellulose butyrate, which examples of cellulose ethers are ethyl cellulose, methyl cellulose and benzyl cellulose.

The low boiling solvents used may be one or a mixture of two or more of the following: acetone, alcohol, benzene or ethylene dichloride.

The medium or high boiling solvent to be employed in our invention may be a higher ketone having four or more carbon atoms having the general formula $CH_3.CO.R$, wherein R represents a residue containing at least two carbon atoms having a hydroxyl group or an unsaturated group.

The following are examples of such higher ketones. Keto butanol or butanol (1) one (3) ($CH_3.CO.CH_2.CH_2OH$) has a boiling point at 23 mm. pressure of 84–85° C. and may be prepared in any suitable manner such as described in Beilstein 4th Edition, Sup. vol. I, 421. The ketone, methylene acetone ($CH_3.CO.CH=CH_2$) may be made by the extraction of one molecule of water from keto butanol as described in Beilstein 4th Edition Sup. vol. I, page 379, and has a boiling point of 80° C., and is representative of a compound $CH_3.CO.R$, wherein R represents an unsaturated residue. The ketone, 2-methyl-butanol (1) one (3) or methyl keto butanol $$(CH_3.CO.CH(CH_3).CH_2OH),$$

is a higher member of the series, has a boiling point at 15 mm. pressure of 90–95° C. and may be made as described on page 422 of vol. I of the supplement to Beilstein 4th Edition. Methylene-ethyl-methyl ketone $(CH_3.CO.C(CH_3)=CH_2)$ has a boiling point of 96° C., and may be prepared by the extraction of one molecule of water from methyl keto butanol as described on page 381 of Beilstein 4th Edition, Sup. vol. I. Octadione (3,7) ol (1), $CH_3.CO(CH_2)_3.CO.CH_2.CH_2OH$ has a boiling point at 22 mm. pressure of 142–143° C. and may be prepared as described in Beilstein, 4th Edition, Sup. vol. I, 431.

As previously stated, a synthetic resin may be employed in such compositions. Examples of such resins are those formed by the condensation of an aryl sulfonamid with an aldehyde such as formaldehyde. The resins belonging in this class are the toluene sulfonamid-formaldehyde resins, the xylene sulfonamid-formaldehyde resins, and the benzene sulfonamid-formaldehyde resins. Other resins that may be employed are the glycol phthalate resins or the diethylene glycol phthalate resins. Obviously the resins employed are of the fusible and soluble type. We have found that resins of the phenolic or cresolic type are also suitable for use in the preparation of lacquers containing organic derivatives of cellulose and having the above mentioned medium boiling solvents therein. Thus the phenol-formaldehyde resins, the diphenylol propane-formaldehyde resins, the diphenylol butane-formaldehyde resins, the cresol-formaldehyde resins, and the xylenol-formaldehyde resins are suitable for use in our invention.

Any suitable plasticizer may be employed if desired. Examples of these plasticizers are diphenylol propane, monomethyl xylene sulfonamid, ethyl toluene sulfonamid, triacetin, etc.

The coating compositions may be applied by flowing, dipping, brushing, spraying or in any other manner. These solutions may be employed on any type of material such as metal, wood, stone, fabric, plastic compositions, etc. These coating compositions may also be employed as adhesives in the preparation of laminated glass, also as adhesives for causing wood, paper, cardboard, asbestos board, etc., to adhere to glass, rubber, metal, wood, etc.

In order further to illustrate our invention but without being limited thereto, the following specific examples are given.

*Example I*

A coating composition containing the new medium boiling point solvent may contain:

| | Parts |
|---|---|
| Cellulose acetate | 10 |
| Acetone | 50 |
| Alcohol | 25 |
| Benzene | 25 |
| Medium boiling point solvent | 15 |

*Example II*

A coating composition containing cellulose acetate and a synthetic resin may also contain softeners and high boilers as follows:

| | Parts |
|---|---|
| Cellulose acetate | 10 |
| Synthetic resin | 10 |
| Acetone | 50 |
| Alcohol | 25 |
| Medium boiling point solvent (as above) | 10 |
| Ethyl lactate | 10 |
| Diethyl phthalate | 4 |
| Pigment, or | 5 |
| Dye | 1 |

Various types of cellulose acetate, both of high and low viscosity characteristics, and varying in solubility from chloroform soluble to acetone soluble may be employed in the above examples. Also various proportions of water may be added to the above solutions.

It is to be understood that the foregoing detailed description is given merely by way of illustration, and that many variations may be made therein without departing from the spirit of our invention.

Having described our invention, what we claim and desire to secure by Letters Patent is:

1. A composition of matter comprising an organic derivative of cellulose dissolved in a solvent mixture containing a higher ketone of the general formula $CH_3.CO.R$, wherein R represents a radical selected from the group consisting of radicals containing the grouping $>CH.CH_2OH$ and radicals containing the grouping $>C=CH_2$.

2. A composition of matter comprising cellulose acetate dissolved in a solvent mixture containing a higher ketone of the general formula $CH_3.CO.R$, wherein R represents a radical selected from the group consisting of radicals containing the grouping $>CH.CH_2OH$ and radicals containing the grouping $>C=CH_2$.

3. A composition of matter comprising an organic derivative of cellulose dissolved in a solvent mixture containing a higher ketone selected from the group consisting of keto-butanol, methylene acetone, methyl-keto-butanol, methylene-ethyl-methyl-ketone and octadione-ol.

4. A composition of matter comprising cellulose acetate dissolved in a solvent mixture containing a higher ketone selected from the group consisting of keto-butanol, methylene acetone, methyl-keto-butanol, methylene-ethyl-methyl-ketone and octadione-ol.

5. A composition of matter comprising an organic derivative of cellulose and a synthetic resin compatible therewith dissolved in a solvent mixture containing a higher ketone of the general formula $CH_3.CO.R$, wherein R represents a radical selected from the group consisting of radicals containing the grouping $>CH.CH_2OH$ and radicals containing the grouping $>C=CH_2$.

6. A composition of matter comprising cellulose acetate and a synthetic resin compatible therewith dissolved in a solvent mixture containing a higher ketone of the general formula $CH_3.CO.R$, wherein R represents a radical selected from the group consisting of radicals containing the group $>CH.CH_2OH$ and radicals containing the grouping $>C=CH_2$.

7. A composition of matter containing an organic derivative of cellulose and a synthetic resin compatible therewith dissolved in a solvent mixture containing a higher ketone selected from the group consisting of keto butanol, methylene acetone, methyl keto butanol, methylene ethyl methyl ketone and octadione-ol.

8. A composition of matter containing cellulose acetate and a synthetic resin compatible therewith dissolved in a solvent mixture containing a higher ketone selected from the group consisting of keto butanol, methylene acetone, methyl keto butanol, methylene ethyl methyl ketone and octadione-ol.

9. A composition of matter containing an organic derivative of cellulose dissolved in a solvent mixture containing keto butanol.

10. A composition of matter containing cellulose acetate dissolved in a solvent mixture containing keto butanol.

11. A composition of matter containing an organic derivative of cellulose and a synthetic resin compatible therewith dissolved in a solvent mixture containing keto butanol.

12. A composition of matter containing cellulose acetate and a synthetic resin compatible therewith dissolved in a solvent mixture containing keto butanol.

13. A composition of matter containing an organic derivative of cellulose and a synthetic resin compatible therewith dissolved in a solvent mixture containing methylene acetone.

14. A composition of matter containing cellulose acetate and a synthetic resin compatible therewith dissolved in a solvent mixture containing methylene acetone.

15. A composition of matter containing an organic derivative of cellulose and a synthetic resin compatible therewith dissolved in a solvent mixture containing octadione-ol.

16. A composition of matter containing cellulose acetate and a synthetic resin compatible therewith dissolved in a solvent mixture containing octadione-ol.

17. A liquid coating composition comprising an organic derivative of cellulose dissolved in a solvent mixture containing a higher ketone of the general formula $CH_3.CO.R$, wherein R represents a radical selected from the group consisting of radicals containing the grouping $>CH.CH_2OH$ and radicals containing the grouping $>C=CH_2$.

18. A liquid coating composition comprising cellulose acetate dissolved in a solvent mixture containing a higher ketone of the general formula $CH_3.CO.R$, wherein R represents a radical selected from the group consisting of radicals containing the grouping $>CH.CH_2OH$ and radicals containing the grouping $>C=CH_2$.

19. A liquid coating composition containing an organic derivative of cellulose and a synthetic resin compatible therewith dissolved in a solvent mixture containing a higher ketone selected from the group consisting of keto butanol, methylene acetone, methyl keto butanol, methylene ethyl methyl ketone and octadione-ol.

20. A liquid coating composition containing cellulose acetate and a synthetic resin compatible therewith dissolved in a solvent mixture containing a higher ketone selected from the group consisting of keto butanol, methylene acetone, methyl keto butanol, methylene ethyl methyl ketone and octadione-ol.

21. Articles having thereon a film derived from the liquid coating composition defined in claim 19.

22. Articles having thereon a film derived from the liquid coating composition defined in claim 20.

WILLIAM HENRY MOSS.
GEORGE WILBUR SEYMOUR.